US011715362B2

(12) United States Patent
Schlagenhauf et al.

(10) Patent No.: US 11,715,362 B2
(45) Date of Patent: *Aug. 1, 2023

(54) INTEGRATED SENSING AND ACTUATION MODULE FOR WRISTBAND ENABLING IDENTIFICATION AND/OR COMPENSATION FOR BAND TIGHTNESS

(71) Applicant: Google LLC, Mountain View, CA (US)

(72) Inventors: Franziska Schlagenhauf, Ludwidsberg (DE); Nina R. Sinatra, Menlo Park, CA (US); Kurtis Robert Gross, Mountain View, CA (US); Kelly Elizabeth Dobson, Mountain View, CA (US); Artem Dementyev, Somerville, MA (US); Alex Olwal, Stockholm (SE); Richard Francis Lyon, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/366,890

(22) Filed: Jul. 2, 2021

(65) Prior Publication Data
US 2023/0005354 A1    Jan. 5, 2023

(51) Int. Cl.
*G08B 21/18* (2006.01)
*G01L 5/10* (2020.01)
(Continued)

(52) U.S. Cl.
CPC ............ *G08B 21/182* (2013.01); *B06B 1/045* (2013.01); *G01L 5/10* (2013.01); *G08B 7/06* (2013.01)

(58) Field of Classification Search
CPC ........ G08B 21/182; G08B 7/06; B06B 1/045; G01L 5/10
(Continued)

(56) References Cited

U.S. PATENT DOCUMENTS

| 9,368,006 B1 | 6/2016 | Gorilovsky |
| 10,908,732 B1 | 2/2021 | Sundara-Rajan et al. |

(Continued)

OTHER PUBLICATIONS

Google AI Blog, "Haptics with Input: Using Linear Resonant Actuators for Sensing", Nov. 18, 2020, https://ai.googleblog.com/2020/11/haptics-with-input-using-linear.html?m=1, retrieved on Apr. 5, 2021, 7 pages.
(Continued)

*Primary Examiner* — Zhen Y Wu
(74) *Attorney, Agent, or Firm* — Dority & Manning, P.A.

(57) ABSTRACT

A wearable device can include a wearable band configured to contact a user of the wearable device, an actuator, a sensor, and one or more processors in communication with the actuator and the sensor. The processors can be configured to measure a back electromotive force ("EMF") of the actuator; determine, based on the measured back EMF, data that describes a contact force between the wearable band and the user; and determine, based on the data that describes the contact force, a quality metric describing a data quality of sensor data collected by the sensor. In some embodiments, the processor(s) can determine, generate sensor output data based on the sensor data and based at least in part on the data describing the contact force between the wearable band and the user. For example, one or more machine-learned models maybe leveraged to generate sensor output data that is compensated for the wearable band being too tight or too loose.

20 Claims, 8 Drawing Sheets

(51) Int. Cl.
   *G08B 7/06* (2006.01)
   *B06B 1/04* (2006.01)
(58) Field of Classification Search
   USPC .......................................................... 340/668
   See application file for complete search history.

(56) References Cited

U.S. PATENT DOCUMENTS

| | | | | |
|---|---|---|---|---|
| 2010/0284781 | A1* | 11/2010 | Zwinger | G06F 1/20 361/679.48 |
| 2010/0301749 | A1* | 12/2010 | Tseng | H02K 7/1892 290/1 R |
| 2013/0053661 | A1* | 2/2013 | Alberth | A61B 5/1455 600/390 |
| 2015/0332565 | A1* | 11/2015 | Cho | H10N 30/20 310/317 |
| 2016/0139668 | A1 | 5/2016 | Lee et al. | |
| 2016/0328023 | A1 | 11/2016 | Mistry et al. | |
| 2016/0378069 | A1 | 12/2016 | Rothkopf | |
| 2017/0086742 | A1* | 3/2017 | Harrison-Noonan | A61B 5/6843 |
| 2018/0204426 | A1* | 7/2018 | Nagisetty | G08B 6/00 |
| 2018/0356888 | A1* | 12/2018 | Rihn | G01L 5/103 |
| 2018/0356890 | A1* | 12/2018 | Zhang | A61H 23/0263 |
| 2021/0319677 | A1* | 10/2021 | Wang | B06B 1/0261 |
| 2022/0263447 | A1* | 8/2022 | Dementyev | H02P 6/182 |

OTHER PUBLICATIONS

Nakamura et al., "WaistonBelt X: A Belt-Type Wearable Device with Sensing and Intervention Toward Health Behavior Change", Sensors 2019, vol. 19, No. 20, 21 pages.

* cited by examiner

INTEGRATED SENSING AND ACTUATION MODULE FOR WRISTBAND ENABLING IDENTIFICATION AND/OR COMPENSATION FOR BAND TIGHTNESS

FIELD

The present disclosure relates generally to interactive objects including touch-sensors.

BACKGROUND

Mobile and wearable devices, such as smart phones and smart watches, include a linear resonant actuator ("LRA") to provide haptic feedback to a user. The LRA is a linear electric motor that uses resonance to provide haptic feedback. For example, the LRA may produce a vibration when the device is touched by a user. Wearable devices can also include sensors. However, wearing the device at an appropriately tightness can be critical to obtaining accurate data from the sensor.

SUMMARY

Aspects and advantages of embodiments of the present disclosure will be set forth in part in the following description, or may be learned from the description, or may be learned through practice of the embodiments.

Aspects of the present disclosure are directed to a wearable device. The wearable device can include a wearable band configured to contact a user of the wearable device, an actuator, a sensor, and one or more processors in communication with the actuator and the sensor. The processors can be configured to measure a back electromotive force ("EMF") of the actuator; determine, based on the measured back EMF, data that describes a contact force between the wearable band and the user; and determine, based on the data that describes the contact force, a quality metric describing a data quality of sensor data collected by the sensor.

Another aspect of the present disclosure is directed to a wearable device. The wearable device can include a wearable band configured to contact a user of the wearable device, an actuator, a sensor, and one or more processors in communication with the actuator and the sensor. The processors can be configured to measure a back electromotive force ("EMF") of the actuator; determine, based on the measured back EMF, data describing a contact force between the wearable band and the user; and generate sensor output data based on the sensor data and based at least in part on the data describing the contact force between the wearable band and the user.

Another aspect of the present disclosure is directed to a method for determining sensor data quality for a wearable device. The method can include measuring a back electromotive force ("EMF") of an actuator of the wearable device; determining, based on the measured back EMF, data that describes a contact force between a wearable band of the wearable device and the user; and determining, based on the data that describes the contact force, a quality metric describing a data quality of sensor data collected by a sensor of the wearable device.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to a wearable device. The wearable device can include a wearable band configured to contact a user of the wearable device. As one example, the wearable device can be or include a smartwatch, movement tracker, or other wearable device that is worn on a wrist of a user. The wearable device can include an actuator, a sensor, and one or more processors in communication with the actuator and sensor. The processor(s) can be configured to measure a back electromotive force ("EMF") of the actuator. For example, an input signal corresponding with a pulse, tap, or the like can be transmitted to the actuator. Electrical signals associated with application of the input signal to the actuator can be measured by the processor. The processor can determine, based on the measured back EMF, data that describes a contact force between the wearable band and the user. For example, the contact force can be applied between the sensor and the wrist of the user. The contact force can be associated with a pressure applied to the user's wrist by the wearable band of the wearable device. The processor can determine, based on the data that describes the contact force, a quality metric describing a data quality of sensor data collected by the sensor. If the wearable band is secured too loosely or too tightly on the user's wrist, the quality of sensor data may be compromised. As one example, in some embodiments, the sensor can include multiple electrodes configured to contact the user's skin. If the wearable band is too loose, one or more electrodes may not be contacting the user's skin or may intermittently be contacting the user's skin. Such data corruption may not be apparent or readily detectable by observing the sensor data itself. Aspects of the present disclosure can facilitate detection and/or correction of such corrupt data.

In some embodiments, the processor(s) can be configured to identify a portion of the sensor data as corrupt based on the quality metric. The corrupt data can be discarded or otherwise treated differently than sensor data that has not been identified as corrupt. For example, the processor(s) can be configured to exclude the portion of the sensor data identified as corrupt from further processing. Sensor data that has not been identified as corrupt can be processed to generate sensor output data based on the sensor data and based at least in part on the data that describes the contact force. For instance, the sensor can be or include one or more of the following: a photoplethysmogram (PPG) sensor, temperature sensor, relative humidity sensor, electro-dermal-activity (EDA) sensor, electrocardiogram (ECG) sensor, and an electromyography (EMG) sensor. The sensor can be or include any type of suitable sensor, however. For a temperature sensor, the sensor output data can be or include a skin temperature of the user. For a PPG sensor, the sensor output data can be or include a pulse rate and/or blood pressure. Sensor data that has been identified as corrupt can be excluded from the determination of the sensor output data to avoid generating a sensor output data that is likely to be incorrect.

In some embodiments, the sensor can be arranged in a stacked configuration with the actuator. For example, the sensor and/or actuator can be generally disk or coin shaped. The sensor and actuator can be stacked in a similar manner as two coins can be stacked. The sensor can have a pair of opposing parallel surfaces, and the actuator can have a pair of opposing parallel surfaces that are arranged parallel with the pair of opposing parallel surfaces of the sensor. This configuration can reduce the space needed for the actuator and sensor to be provided within and/or coupled to the wearable band. For example, the actuator can be stacked over the sensor, which can contact the user's skin (e.g., wrist). In some embodiments, the sensor, or a portion thereof (e.g., one or more electrodes) can directly contact the user's skin. However, in other embodiments one or more intermediate layers may be arranged between the sensor and the user's skin.

In some embodiments, the processor(s) can be further configured to determine that the contact force exceeds an upper threshold (e.g., that the wearable band is arranged too tightly on the user's wrist). In response to this determination, the processor(s) can provide a notification to the user of the wearable device. For example, the notification can include a visual notification, audible notification, haptic notification, or combination thereof. For instance, the notification can include a beeping sound, haptic buzzing, and text displayed instructing the user to loosen the wearable band.

Similarly, in some embodiments, the processor(s) can be configured to determine when the wearable band is too loose. The processor(s) can notify the user as described above. For instance, the processor(s) can determine that the contact force is less than a lower threshold. In response to determining that the contact force is less than the lower threshold, the processor(s) can provide a notification to the user of the wearable device. The notification can include an instruction to tighten the wearable band.

In some embodiments, the wearable band may be configured to automatically adjust the tightness of the wearable band. For example, in response to determining that the contact force exceeds the upper threshold (e.g., that the wearable band is arranged too tightly on the user's wrist), the processor(s) can control a tightness adjustment actuator of the wearable band to loosen the wearable band. As another example, in response to determining that the contact force is less than the lower threshold (e.g., that the wearable band is arranged too loosely on the user's wrist), the processor(s) can control a tightness adjustment actuator of the wearable band to tighten the wearable band. The tightness adjustment actuator of the wearable band can include a variety of types of actuators and/or mechanisms to automatically adjust the tightness of the band. As another example mechanism for automatically tightening and/or loosening the wearable band, the wearable band may include a material or mechanism configured to lengthen (e.g., causing the band to loosen) or shorten (e.g., causing the band to tighten) in response to the actuator of the wearable device vibrating (e.g., in a pulsing manner or continuously) at a particular frequency in a particular pattern of frequencies.

The processor(s) can determine the upper threshold and/or lower threshold based on criteria. For example, the processor(s) can determine a current activity being performed by the user and determine at least one of the upper threshold or the lower threshold based on the current activity. The current activity can include a stationary activity (e.g., sitting, standing, sleeping, etc.) or an activity including movement or exercise, such as walking, jogging, running, skiing, weight lifting, kayaking, rock climbing, or the like. The processors may determine higher thresholds for activities including movement or exercise than stationary activities. For instance, the processor may determine that the wearable band should be arranged tighter for more vigorous activities, such as running, as compared with stationary or sedentary activities, such as sitting or standing. Such thresholds can be updated as the user changes activities.

Additionally, in some embodiments, the processors can be configured to determine when the contact force is within a range that is ideal or acceptable for use of the wearable device. The processors can provide notifications to the user based on this determination. For instance, when the user is tightening the wearable device as he or she is putting it on his or her wrist, the wearable device can notify the user when the wearable band is tightened such that the contact force is within the range.

In some embodiments, the actuator can include a linear resonant actuator including an internally moving mass. The processor(s) can be configured to measure a damping of the internally moving mass. The damping of the internally moving mass can be used when determining the back EMF and/or contact force. The linear resonant actuator including a magnet and a spring. The internally moving mass and the magnet can be coupled to the spring. However, other types of actuators can be implemented, such as piezoelectric actuators, eccentric rotating mass (ERM), or actuators employing a combination of actuator types described herein.

According to aspects of the present disclosure, the processor can adjust the sensor data based on the contact force. For example, the processor can adjust or compensate for the contact force being outside of an ideal or nominal range for the sensor. The processor(s) of the wearable device can be configured to measure a back electromotive force ("EMF") of the actuator and determine, based on the measured back EMF, data describing a contact force between the wearable band and the user. The processor can generate sensor output data based on the sensor data and based at least in part on the data describing the contact force between the wearable band and the user.

The processors can determine one or more of an upper bound or a lower bound for the contact force range based on contextual data. For example, the processor can determine the upper bound or lower bound based on a current activity being performed by the user, for example as described above with respect to the upper threshold and lower threshold for the contact force for notifications to the user.

For example, the processor can determine that the contact force falls outside of a contact force range. The processor can determine a compensation value for the sensor data based on the contact force being outside of the contact force range. The processor can adjust the sensor output data based on the compensation value. Determining the compensation value for the sensor data based on the contact force being outside of the contact force range can include determining the compensation value for the sensor data based on a difference between the contact force and at least one of an upper bound or a lower bound of the contact force range. The compensation value can be determined based on an empirical correlation between the difference and empirically detected error values. Various methods can be used to determine the compensation value based on the contact force with respect to the contact force range. Examples include lookup tables, best-fit equations (e.g., polynomial, logarithmic, etc.), machine-learned models, or the like.

Aspects of the present disclosure are directed to a method for determining sensor data quality for a wearable device. The method can include measuring a back electromotive force ("EMF") of an actuator of the wearable device; determining, based on the measured back EMF, the data that describes the contact force between a wearable band of the wearable device and the user; and determining, based on the data that describes the contact force, a quality metric describing a data quality of sensor data collected by a sensor of the wearable device.

Figure 1A:
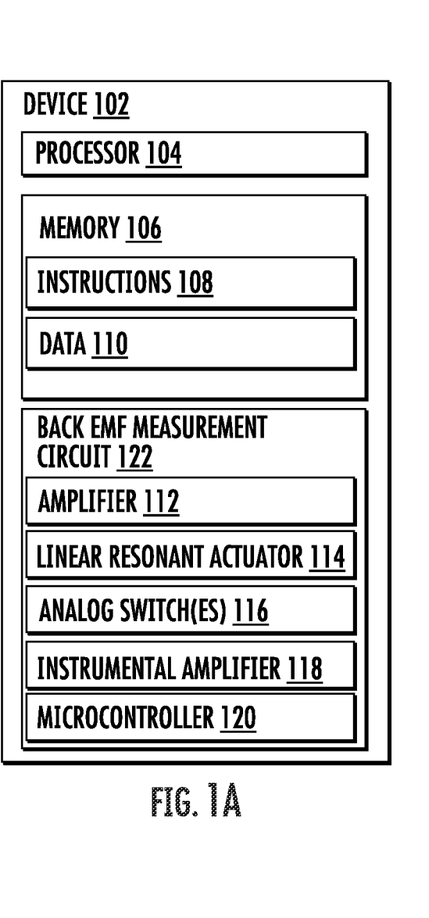
FIG. 1A is a functional block diagram of a device in accordance with aspects of the disclosure.

FIG. 1A illustrates a device 102 in which the features described above and herein may be implemented. In this example, device 102, may contain one or more processors 104, memory 106, instructions 108, data 110, an amplifier 112, a linear resonant actuator ("LRA") 114, one or more switches 116, an instrumentation amplifier 118, and a microcontroller 120.

The one or more processors 104 may be any conventional processors, such as commercially available microprocessors. Alternatively, the one or more processors may be a dedicated device such as an application specific integrated circuit (ASIC) or other hardware-based processor. Although FIG. 1A functionally illustrates the processor, memory, and other elements of wearable device 102 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of device 102. Accordingly, references to a processor or computing device will be understood to include references to a collection of processors or computing devices or memories that may or may not operate in parallel.

Memory 106 may store information that is accessible by the processors, including instructions 108 that may be executed by the processors 104, and data 110. The memory 106 may be a type of memory operative to store information accessible by the processors 104, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 108 and data 110 are stored on different types of media.

Memory 106 may be retrieved, stored, or modified by processors 104 in accordance with the instructions 108. For instance, although the present disclosure is not limited by a particular data structure, the data 110 may be stored in computer registers, in a relational database as a table having a plurality of different fields and records, XML documents, or flat files. The data 110 may also be formatted in a computer-readable format such as, but not limited to, binary values, ASCII, or Unicode. By further way of example only, the data 110 may be stored as bitmaps composed of pixels that are stored in compressed or uncompressed, or various image formats (e.g., JPEG), vector-based formats (e.g., SVG) or computer instructions for drawing graphics. Moreover, the data 110 may comprise information sufficient to identify the relevant information, such as numbers, descriptive text, proprietary codes, pointers, references to data stored in other memories (including other network locations) or information that is used by a function to calculate the relevant data.

The instructions 108 can be any set of instructions to be executed directly, such as machine code, or indirectly, such as scripts, by the processor 104. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods, and routines of the instructions are explained in more detail below.

Device 102 may include a back EMF measurement circuit 122. The back EMF measurement circuit 122 may include amplifier 112, linear resonant actuator ("LRA") 114 or other suitable type of actuator, one or more switches 116, instrumentation or differential amplifier 118, and microcontroller 120. While the components are each represented in FIG. 1A, FIG. 1B illustrates the schematic of the back EMF measurement circuit 122.

The amplifier 112 may be used for input and output of a signal to LRA 114. According to some examples, amplifier 112 may be an audio amplifier. Amplifier 112 may receive a signal from microcontroller 120. The amplifier 112 may receive the signal as input and may output the signal to the LRA 114. The output of amplifier 112 may be in an analog waveform. The amplifier 112 may include logic and one or more H-bridges 124. The H-bridges 124 may be configured to reverse current and enable electric braking of LRA 114. In some examples, the H-bridge 124 may output a signal that approximates analog waveforms.

Figure 1B:
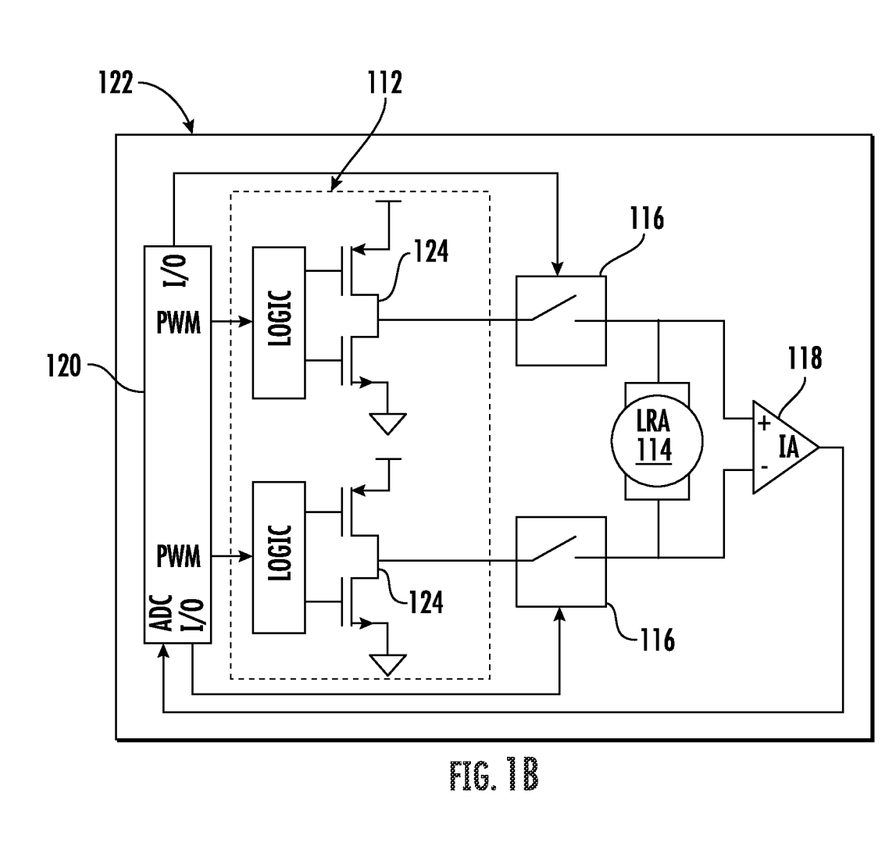
FIG. 1B is a schematic drawing of a back EMF measurement circuit of FIG. 1A in accordance with aspects of the disclosure.

As shown in FIG. 1B, amplifier 112 may be coupled to the LRA 114 via one or more switches 116. According to some examples, switches 116 may be analog switches. When switches 116 are in the closed position, LRA 114 receives the signal transmitted by amplifier 112. The signal transmitted by amplifier 112 to the LRA 114 may be the signal amplifier 112 received from microcontroller 114. The signal may cause the LRA 114 to oscillate. When switches 116 are in the open position, LRA 114 does not receive the signal transmitted from the amplifier 112. The back EMF may be determined when the switches 116 are in the open position.

The LRA 114 may operate as a linear electric motor and may be driven by alternating current. The LRA 114 may operate at a resonance between 150 Hz and 250 Hz. The frequency range of 150 Hz and 250 Hz may correspond to the sensitivity of the tactile receptors of the human body. The LRA 114 may be configured to be a resistor-inductor ("RL") low-pass filter. For example, LRA 114 may convert the signal into an analog waveform.

Figure 1C:
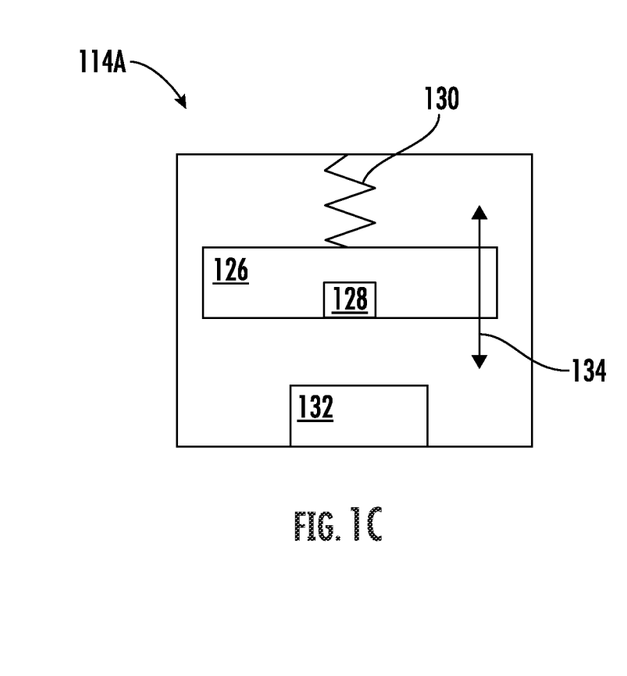
FIG. 1C is a mechanical representation of a LRA in accordance with aspects of the disclosure.

As shown in FIG. 1C, the LRA 114A may contain a mass 126 attached to a spring 130. A magnet 128 may be coupled to mass 126. The mass 126 and magnet 128 may move along an axis 134. As the mass 126 and magnet 128 oscillates, the mass 126 and magnet 128 may move closer and/or further away from coil 132. Coil 132 may be a voice coil. As the mass 128 and magnet 128 oscillates relative to coil 132, the magnet 128 may create magnetic flux. The rate of change of the magnetic flux created by the oscillating magnet 128 may be proportional to the back EMF. For example, as the device is touched, held, worn by a user, or resting on a material surface, the oscillation of the mass may dampen based on how much vibrational energy is absorbed by the object in contact with the device. The dampening of the moving mass may be proportional to the back EMF.

Figure 1D:
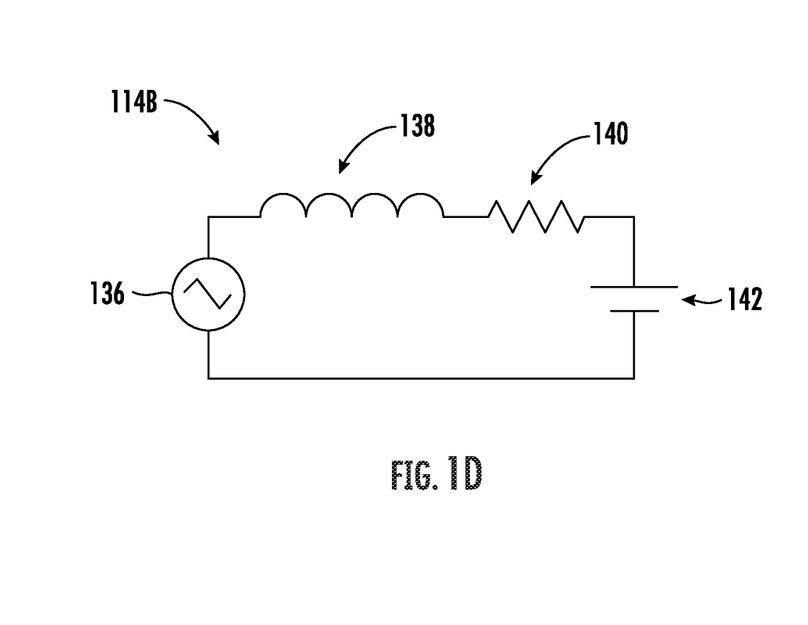
FIG. 1D is a schematic drawing of a LRA in accordance with aspects of the disclosure.

As shown in FIG. 1D, the LRA 114B may be modeled as an electrical circuit. The circuit may include an AC driver 136, inductor 138, resistor 140, and a back EMF measurement location 142.

When the switches 116 are in the open position, such that LRA 114 does not receive the signal, an instrumentation amplifier 118 may be used to determine the back EMF. The back EMF may be proportional to the rate of change of the velocity of the mass of the LRA 114. The back EMF may be measured from the floating voltage between the two LRA leads. For example, when switches 116 are in the open position, the mass in the LRA 114 may still oscillate. The oscillation of the mass within LRA 114 may produce oscillating back EMF voltage.

Instrumentation or a differential amplifier 118 may reduce the common-mode noise, such as 60 Hz power lines, which may overwhelm the signal originating from microcontroller 120. Common-mode noise may be noise from outside the device. For example, the noise may be from other devices or electrical circuits near the device.

Microcontroller 120 may digitize and process signal. The signal may be, for example, a pulse width modulation ("PWM"). The PWM may have a waveform configured to drive LRA 114. The PWM shape may be configured to optimize the capture of the back-EMF signal. Additional details pertaining to the PWM will be discussed herein with respect to FIGS. 2 and 3.

As shown in FIG. 1B, microcontroller 120 may transmit, as output, the signal to amplifier 112. Microcontroller 120 may receive the back EMF, as input, from instrumentation amplifier 118. The microcontroller 120 may transmit the back EMF to the one or more processors 104. The one or more processors 104, based on the determined back EMF, may determine how tight the wearable band of the device is secured around a wrist of the user. For instance, a contact force between the wearable band and the user's wrist may be determined.

Figure 2A:
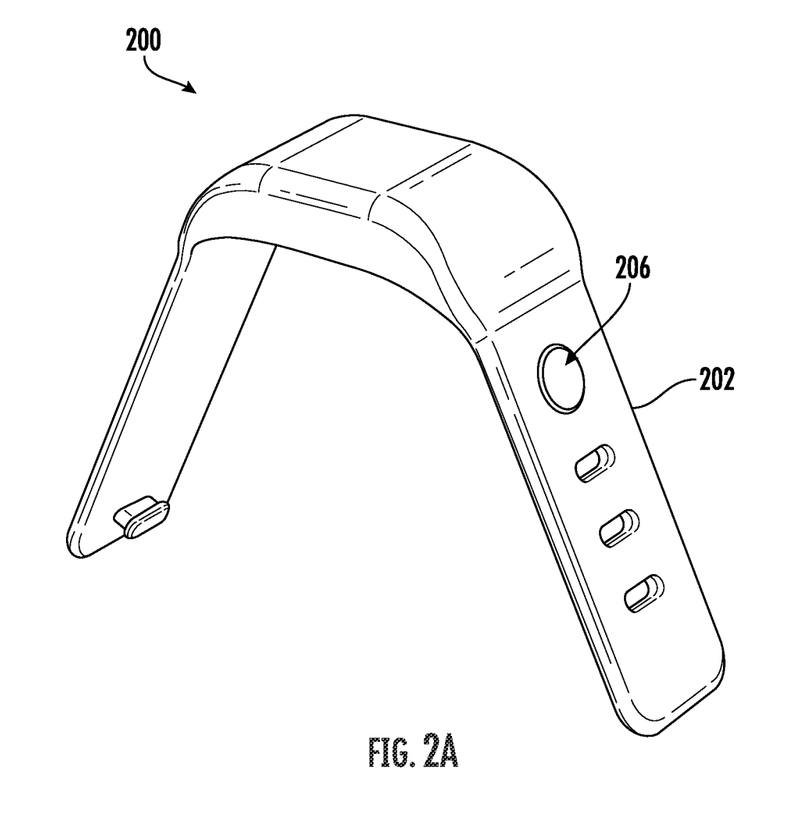
FIG. 2A is a perspective drawing of one embodiment of a wearable device according to aspects of the present disclosure.
Figure 2B:
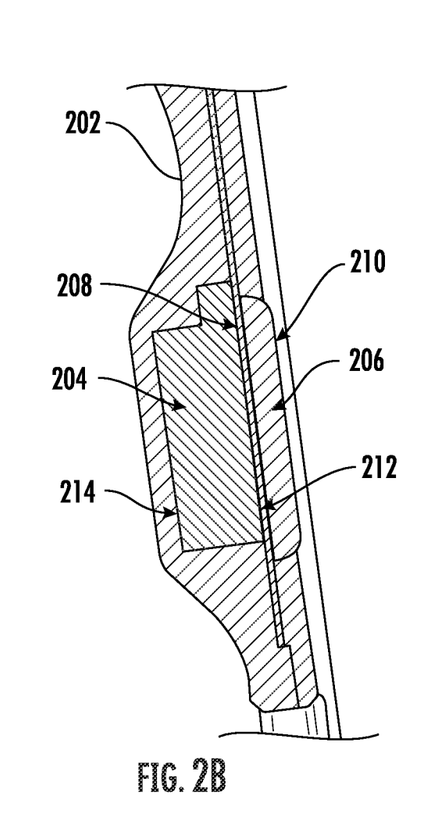
FIG. 2B is a cross sectional view of a wearable band of the wearable device of FIG. 2A, including an actuator and sensor, in which the actuator is arranged closer to the user's skin than the sensor.

FIG. 2A is a perspective drawing of one embodiment of a wearable device 200 according to aspects of the present disclosure. The wearable device 200 can include a wearable band 202 configured to contact a user of the wearable device 200. FIG. 2B is a cross sectional view of the wearable band 202 of the wearable device of FIG. 2A. The wearable device 200 can include an actuator 204 and a sensor 206. In this embodiment, the sensor 206 is arranged in a stacked configuration with the actuator 204. For example, the sensor 206 and/or actuator 204 can be generally disk or coin shaped. The sensor 206 and actuator 204 can be stacked in a similar manner as two coins can be stacked. The sensor 206 can have a pair of opposing parallel surfaces 208, 210. The actuator 204 can have a pair of opposing parallel surfaces 212, 214 that are arranged parallel with the pair of opposing parallel surfaces 208, 210 of the sensor 206. This configuration can reduce the space needed for the actuator 204 and sensor 206 to be provided within and/or coupled to the wearable band 202. In this embodiment, the actuator 204 can be arranged between the sensor 206 and the user's skin when the wearable device 200 is worn by the user.

Figure 3A:
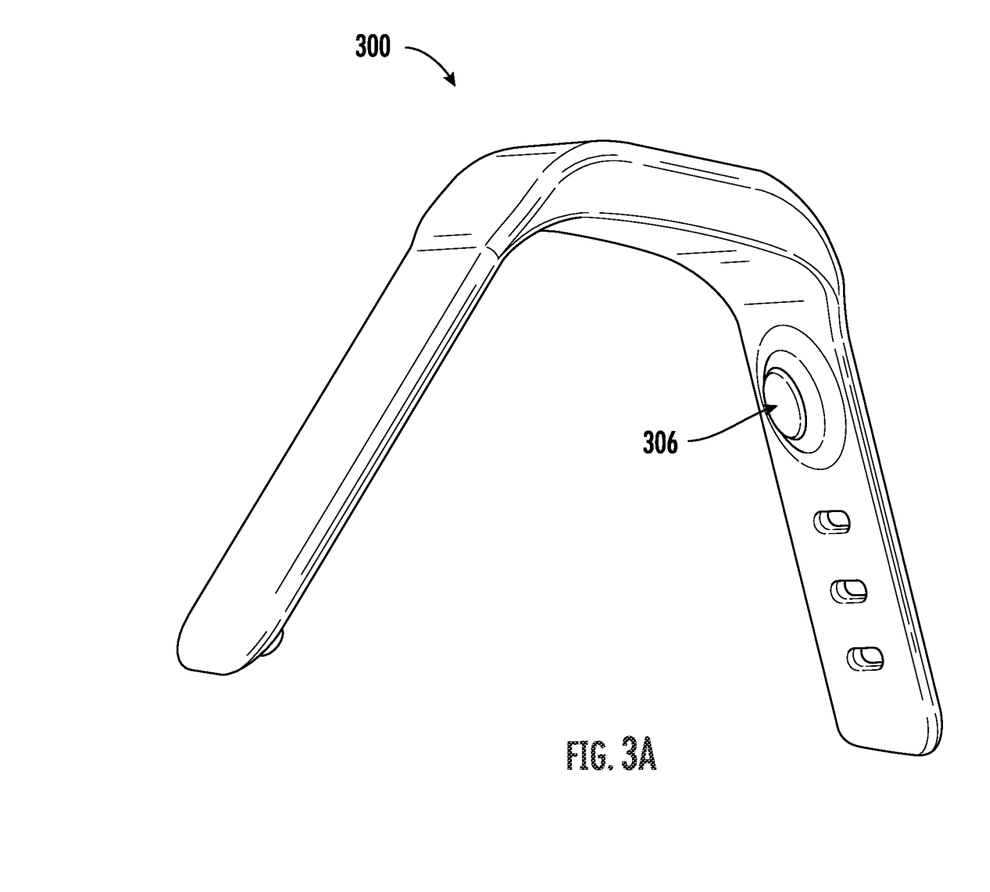
FIG. 3A is a perspective drawing of one embodiment of a wearable device according to aspects of the present disclosure.
Figure 3B:
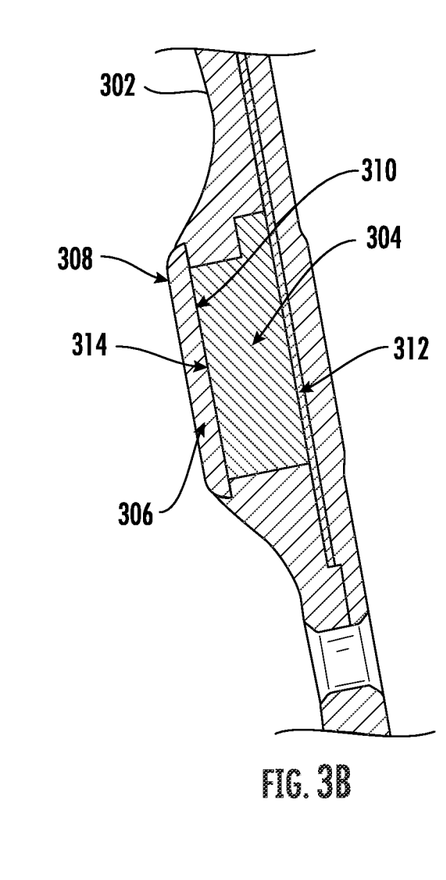
FIG. 3B is a cross sectional view of a wearable band of the wearable device of FIG. 2A, including an actuator and sensor, in which the sensor is arranged closer to the user's skin than the actuator.

FIG. 3A is a perspective drawing of one embodiment of a wearable device 300 according to aspects of the present disclosure. The wearable device 300 can include a wearable band 302 configured to contact a user of the wearable device 300. FIG. 3B is a cross sectional view of the wearable band 302 of the wearable device of FIG. 3A. The wearable device 300 can include an actuator 304 and a sensor 306. In this embodiment, the sensor 306 is arranged in a stacked configuration with the actuator 304. For example, the sensor 306 and/or actuator 304 can be generally disk or coin shaped. The sensor 306 and actuator 304 can be stacked in a similar manner as two coins can be stacked. The sensor 306 can have a pair of opposing parallel surfaces 308, 310. The actuator 304 can have a pair of opposing parallel surfaces 312, 314 that are arranged parallel with the pair of opposing parallel surfaces 308, 310 of the sensor 306. In this embodiment, the sensor 306 is arranged closer to the user's skin than the actuator 304. For example, the sensor 306 may be exposed with respect to the wearable band 302 such that the sensor 306 can directly contact the user's skin when the wearable device 300 is worn the by the user. Similar to the configuration of the wearable device 200 of FIGS. 2A and 2B, the configuration of the wearable device 300 of FIGS. 3A and 3B can reduce the space needed for the actuator 304 and sensor 306 to be provided within and/or coupled to the wearable band 302.

Figure 4A:
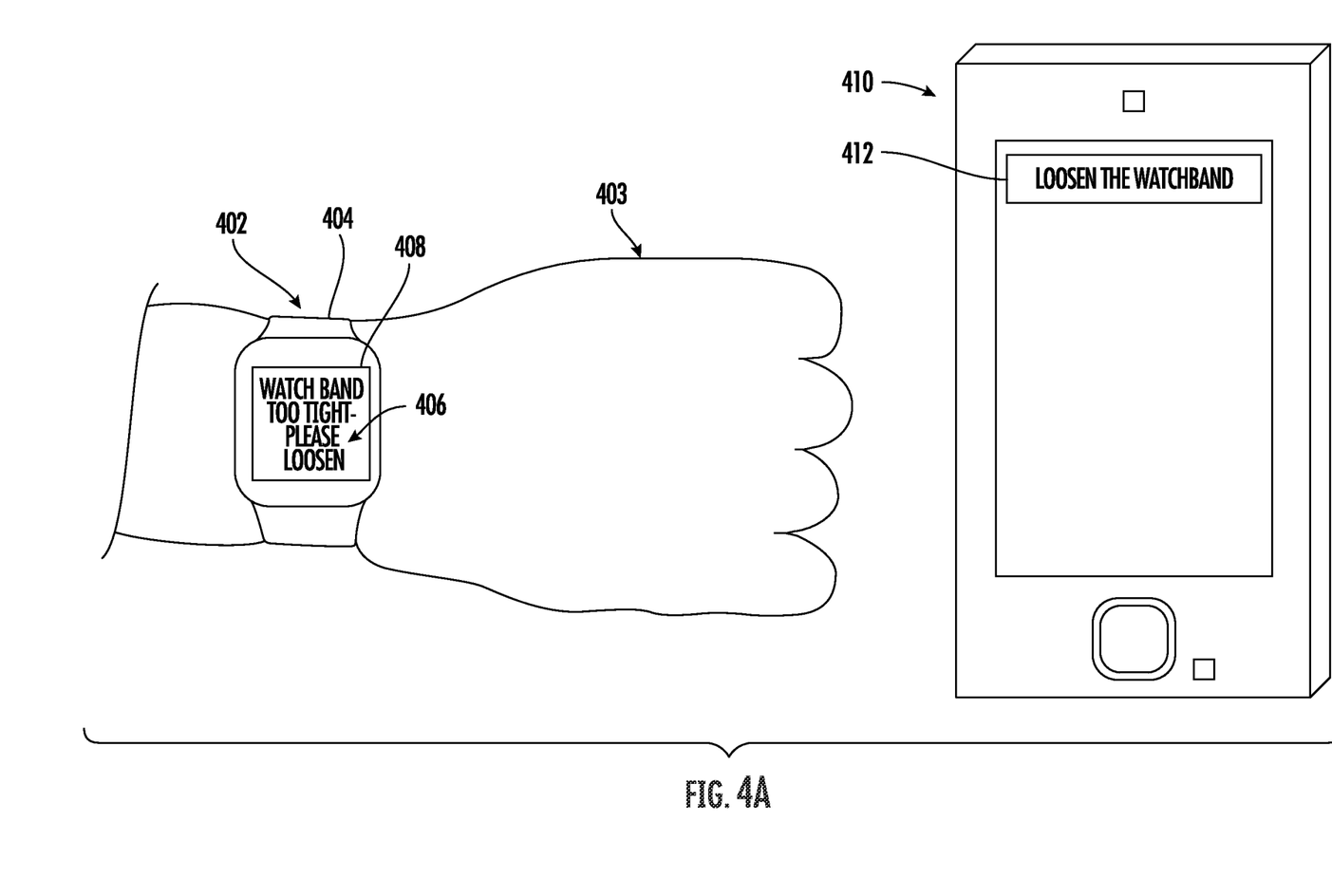
FIG. 4A illustrates an example wearable device and user device providing a notification to the user instructing the user to loosen the wearable band of the wearable device.
Figure 4B:
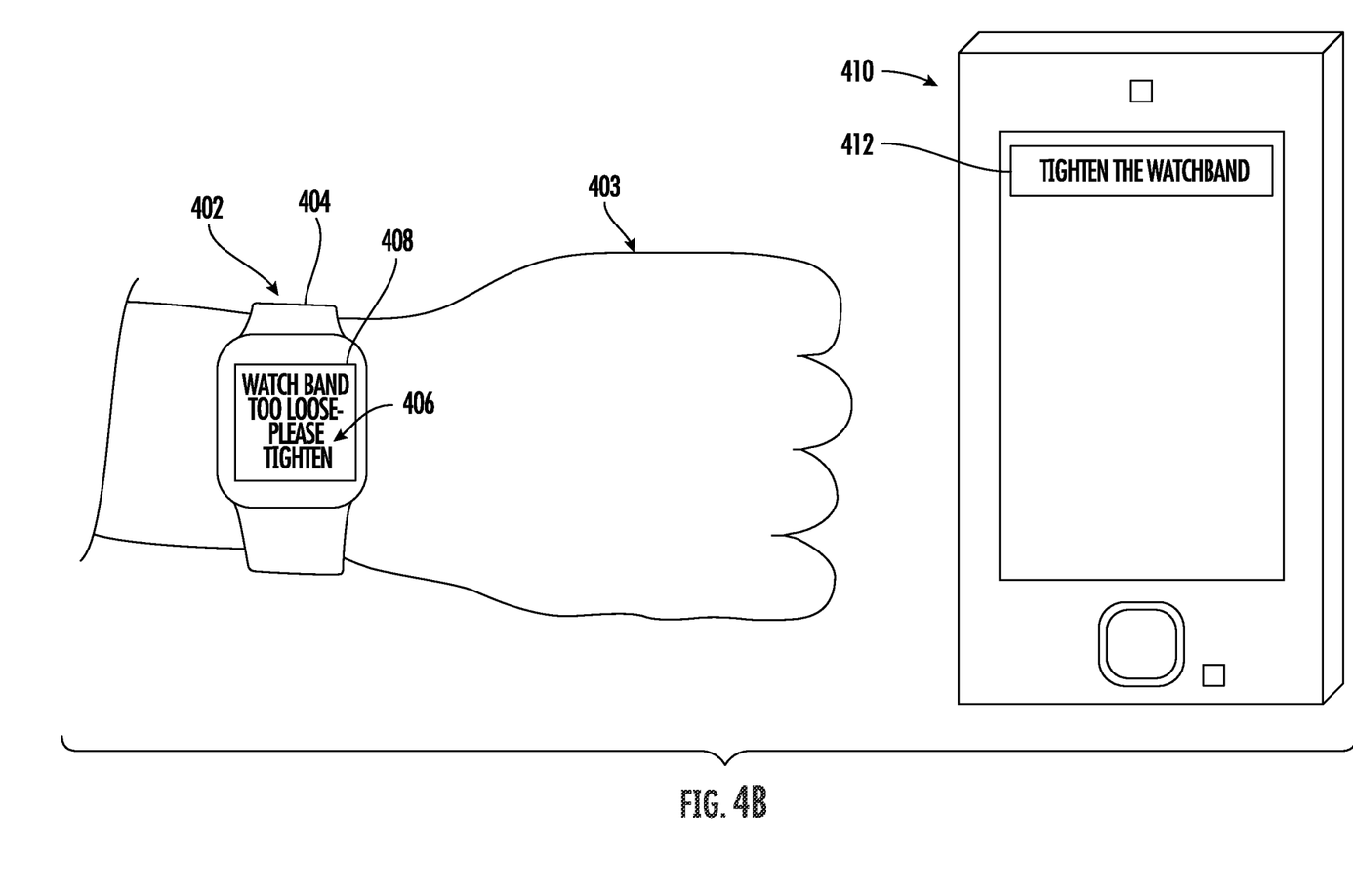
FIG. 4B illustrates the example wearable device and user device of FIG. 4A providing a notification to the user instructing the user to tighten the wearable band of the wearable device.

FIGS. 4A and 4B illustrate a wearable device 402 and user device 410 providing example notifications to the user of a wearable device 402. The wearable device 402 (e.g., the processor(s) thereof) can be configured to determine that the contact force exceeds an upper threshold (e.g., that a wearable band 404 of the wearable device 402 is arranged too tightly on the user 403). In response to this determination, the processor(s) can provide a notification 406 to the user of the wearable device 402. In this example, the notification 406 can include a visual notification displayed on a screen 408 of the wearable device 402. In this example, the notification includes the following text "Watchband too tight—please loosen." The notification 406 can include an audible notification, haptic notification, or combination thereof. For instance, the notification can include a beeping sound, haptic buzzing, and the text displayed instructing the user to loosen the wearable band. As another example, a light on the watch may flash a particular color to indicate the band is too tight, a different particular color to indicate that the band is too loose, and/or a third color to indicate that the band is tightened to within an appropriate tightness range.

In some embodiments, the upper threshold and/or lower threshold can be determined based on a variety of criteria. For example, the processor(s) can determine a current activity being performed by the user and determine at least one of the upper threshold or the lower threshold based on the current activity. The current activity can include a stationary activity (e.g., sitting, standing, sleeping, etc.) or an activity including movement or exercise, such as walking, jogging, running, skiing, weight lifting, kayaking, rock climbing, or the like. The processors may determine higher thresholds for activities including movement or exercise than stationary activities. For instance, the processor may determine that the wearable band should be arranged tighter for more vigorous activities, such as running, as compared with stationary or sedentary activities, such as sitting or standing. Such thresholds can be updated as the user changes activities.

According to some examples, the wearable device 402 may be a smartwatch. The wearable device 402 may include a short-range communications interface that allows the accessory to be coupled to the host device. The wireless coupling may be established using any of a variety of techniques, such as Bluetooth, Bluetooth low energy (BLE), etc. The host device may be, for example, smartphone, a laptop computer, or any of a variety of other host devices, such as gaming systems, tablets, etc. In this example, the wearable device 402 may be in communication with a user device 410, such as a tablet. The user device 410 may be configured to display a notification 412 to the user. For example, the wearable device 402 can transmit instructions to the tablet 410 to display the notification 412, and the user device 410 can display the notification 412 in response to receiving the instructions.

FIG. 4B illustrates the example wearable device 402 and user device 410 of FIG. 4A. In this example, the wearable device 402 and user device 410 are providing notification to the user instructing the user to tighten the wearable band 404 of the wearable device 402, when the wearable band 404 is too loose.

In some embodiments, the processor can determine that the contact force falls outside of a contact force range. The processor can determine a compensation value for the sensor data based on the contact force being outside of the contact force range. The processor can adjust the sensor output data based on the compensation value. Determining the compensation value for the sensor data based on the contact force being outside of the contact force range can include determining the compensation value for the sensor data based on a difference between the contact force and at least one of an upper bound or a lower bound of the contact force range. For instance, the compensation value can be determined based on an empirical correlation between the difference and empirically detected error values. However, various methods can be used to determine the compensation value based on the contact force with respect to the contact force range. Examples include lookup tables, best-fit equations (e.g., polynomial, logarithmic, etc.), machine-learned models, or the like. For example, a machine-learned model can be trained and leveraged as described below with reference to FIGS. 5A and 5B.

Figure 5A:
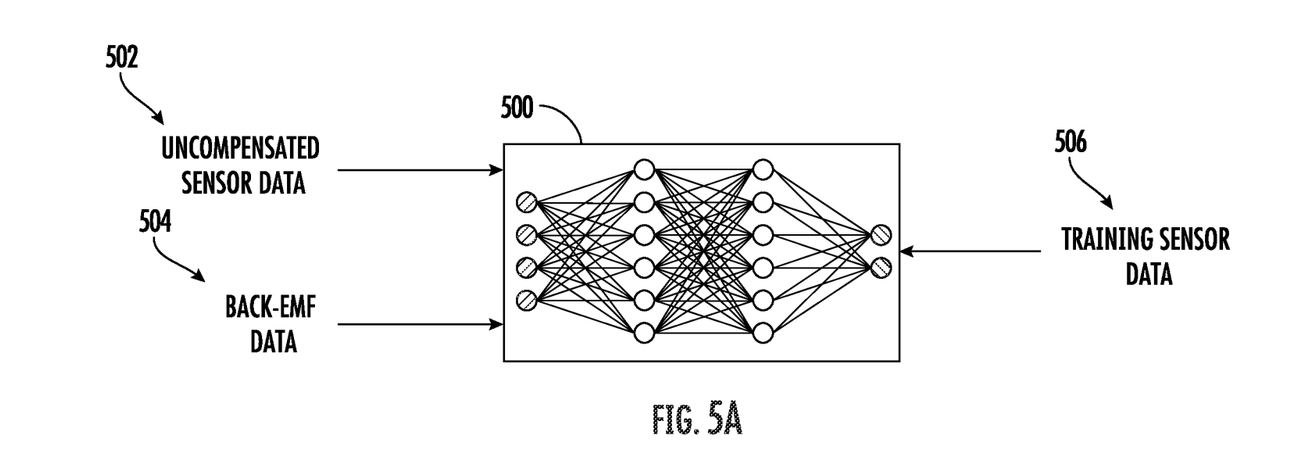
FIG. 5A is a schematic illustration of training a machine-learned model for compensating sensor data based on back EMF data associated with the actuator.
Figure 5B:
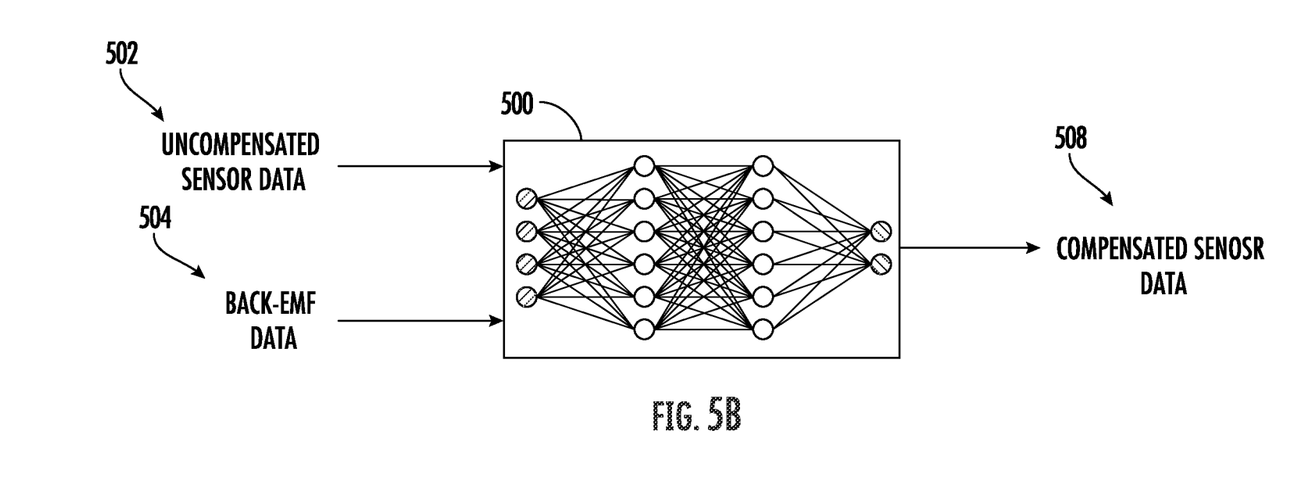
FIG. 5B is a schematic illustration of a machine-learned model that is trained to output compensated sensor data based on back EMF data associated with the actuator.

FIG. 5A is a schematic illustration a machine-learned model 500 for compensating sensor data based on back EMF data associated with an actuator of a wearable device as described herein during training of the machine-learned model 500. FIG. 5B is a schematic illustration of the machine-learned model 500 of FIG. 5A outputting compensated sensor data 508 at an inference time. The machine-learned models configured to perform or assist with one or more of the determinations and/or steps described herein. The machine-learned models described herein can be or can otherwise include one or more various model(s) such as, for example, decision tree-based models (e.g., random forest models such as boosted random forest classifiers), neural networks (e.g., deep neural networks), or other multi-layer non-linear models. Neural networks can include recurrent neural networks (e.g., long short-term memory recurrent neural networks), feed-forward neural networks, convolutional neural networks, and/or other forms of neural networks.

Referring to FIG. 5A, the machine-learned model 500 can be configured to receive uncompensated sensor data 502 from a sensor of the wearable device and back-EMF data 504 associated with an actuator of the wearable device. Training sensor data 506 can be used to train the machine-learned model 500 to output compensated sensor data 508 (FIG. 5B) at an inference time. The training sensor data 506 can represent ground truth (e.g., sensor data that the sensor would generate if the wearable band were tightened to within an acceptable tightness range). Errors can back propagated during supervised training to train the machine-learned model 500 to output the compensated sensor data 508.

For example, the band can be loosened and tightened on the user's wrist while the uncompensated sensor data 502 and back-EMF data 504 is collected. The training sensor data 506 can be collected by a second wearable device including a second sensor and second actuator. The second wearable device can be arranged on the user's wrist (e.g., the same wrist or the user's other wrist) and configured to collect similar sensor data with respect the user. The second wearable device can include the same type of sensor as the wearable device. When tightening and loosening the (first) wearable device, the second wearable device can collect the training sensor data 506 without being tightened or loosened.

Referring to FIG. 5B, at an inference time, the trained machine-learned model 500 can be configured to receive the sensor data 502 and back-EMF data 504 from the wearable device. The machine-learned 500 can output the compensated sensor data 508, which can generally be corrected based on the back-EMF data 504. The back-EMF data 504 can be indicative of a tightness of the wearable band. In other words, the compensated sensor data 508 can be compensated or corrected for the wearable band being too tight or too loose such that the compensated sensor data 508 more closely resembles sensor data that would have been collected if the wearable band had been secured on the wrist of the user at an appropriate tightness level.

Figure 6:
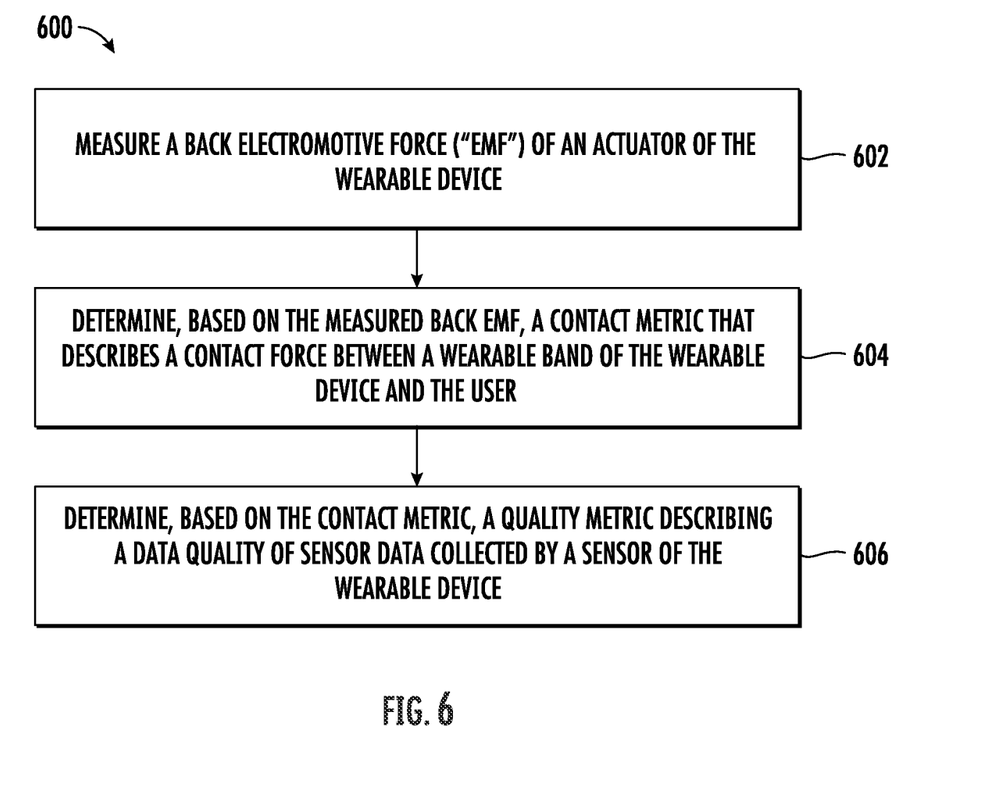
FIG. 6 illustrates a flowchart of a method for determining sensor data quality for a wearable device according to aspects of the present disclosure.

FIG. 6 illustrates a flowchart of a method 600 for determining sensor data quality for a wearable device according to aspects of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The method 600 can include, at (602), measuring a back electromotive force ("EMF") of an actuator of the wearable device. For example, an input signal corresponding with a pulse, tap, or the like can be transmitted to the actuator. Electrical signals associated with application of the input signal to the actuator can be measured by the processor.

The method, at (604), can include determining, based on the measured back EMF, a contact metric that describes a contact force between a wearable band of the wearable device and the user.

The method 600 can include, at (606), determining, based on the data that describes the contact force, a quality metric describing a data quality of sensor data collected by the sensor. As one example, the quality metric can include or describe a confidence value describing a likelihood that the data is accurate. If the wearable band is secured too loosely or too tightly on the user's wrist, the quality of sensor data may be compromised. As one example, in some embodiments, the sensor can include multiple electrodes configured to contact the user's skin. If the wearable band is too loose, one or more electrodes may not be contacting the user's skin or may intermittently be contacting the user's skin. Such data corruption may not be apparent or readily detectable by observing the sensor data itself. Aspects of the present disclosure can facilitate detection and/or correction of such corrupt data. As another example, if the wearable band is too tight, it may adversely affect the parameter (e.g., blood pressure, temperature, pulse, etc.) that the sensor is configured to detect.

The processor(s) can be configured to identify a portion of the sensor data as corrupt based on the quality metric. For example, sensor data can be identified as corrupt having a quality metric falling outside of a quality metric range. The quality metric range can be empirically determined or theoretically determined. The corrupt data can be discarded or otherwise treated differently than sensor data that has not been identified as corrupt. For example, the processor(s) can be configured to exclude the portion of the sensor data identified as corrupt from further processing. Sensor data that has not been identified as corrupt can be processed to generate sensor output data based on the sensor data and based at least in part on the data that describes the contact force. As another example, the corrupt data can be compensated, as described herein, to generate compensated sensor data that more closely resembled sensor data that would have been collected if the wearable band were tightened within the appropriate tightness range.

For instance, the sensor can be or include one or more of the following: a photoplethysmogram (PPG) sensor, temperature sensor, relative humidity sensor, electro-dermal-activity (EDA) sensor, electrocardiogram (ECG) sensor, and an electromyography (EMG) sensor. The sensor can be or include any type of suitable sensor, however. For a temperature sensor, the sensor output data can be or include a skin temperature of the user. For a PPG sensor, the sensor output data can be or include a pulse rate and/or blood pressure. Sensor data that has been identified as corrupt can be excluded from the determination of the sensor output data to avoid generating a sensor output data that is likely to be incorrect. In other embodiments, the sensor data can be compensated, as described herein, to generate compensated sensor output data that more closely resembles sensor output data that would have been collected if the wearable band were tightened to within an appropriate tightness range.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wearable device, comprising:
   a wearable band configured to contact a user of the wearable device;
   an actuator;
   a sensor; and
   one or more processors in communication with the actuator and the sensor, the one or more processors configured to:
     measure a back electromotive force ("EMF") of the actuator;
     determine, based on the measured back EMF, data that describes a contact force between the wearable band and the user;
     determine, based on the data that describes the contact force, a quality metric describing a data quality of sensor data collected by the sensor; and
     identify a portion of the sensor data as corrupt based on the quality metric.

2. The wearable device of claim 1, wherein the sensor is arranged in a stacked configuration with the actuator.

3. The wearable device of claim 1, wherein the sensor comprises a pair of opposing parallel surfaces, and the actuator comprises a pair of opposing parallel surfaces that are arranged parallel with the pair of opposing parallel surfaces of the sensor.

4. The wearable device of claim 1, wherein the one or more processors is further configured to:
   determine that the contact force at least one of exceeds an upper threshold or is less than a lower threshold; and
   in response to determining that the contact force exceeds the upper threshold, provide a notification to the user of the wearable device.

5. The wearable device of claim 4, wherein the one or more processors is further configured to:
   determine a current activity being performed by the user; and
   determine at least one of the upper threshold or the lower threshold based on the current activity.

6. The wearable device of claim 1, wherein the actuator comprises a linear resonant actuator.

7. The wearable device of claim 1, wherein the one or more processors is configured to generate sensor output data based at least in part on the portion of the sensor data identified as corrupt.

8. The wearable device of claim 1, wherein the one or more processors is configured to, in response to identifying the portion of the sensor data as corrupt based on the quality metric, exclude the portion of the sensor data from further processing.

9. The wearable device of claim 1, wherein the one or more processors is configured to generate sensor output data based on the sensor data and based at least in part on the data that describes the contact force.

10. The wearable device of claim 1, wherein the sensor comprises at least one of a photoplethysmogram (PPG) sensor, temperature sensor, relative humidity sensor, electrodermal-activity (EDA) sensor, electrocardiogram (ECG) sensor, and an electromyography (EMG) sensor.

11. A wearable device, comprising:
a wearable band configured to contact a user of the wearable device;
an actuator;
a sensor; and
one or more processors in communication with the actuator and the sensor, the one or more processors configured to:
measure a back electromotive force ("EMF") of the actuator;
determine, based on the measured back EMF, data describing a contact force between the wearable band and the user; and
generate sensor output data based on sensor data from the sensor and based at least in part on the data describing the contact force between the wearable band and the user, wherein generating the sensor output data includes determining a compensation value for the sensor data based on the contact force and generating the sensor output data based at least in part on the compensation value.

12. The wearable device of claim 11, wherein generating the sensor output data based on the sensor data and based at least in part on the data that describes the contact force comprises:
determining that the contact force falls outside of a contact force range; and
determining the compensation value for the sensor data based on the contact force being outside of the contact force range; and
adjusting the sensor data based on the compensation value.

13. The wearable device of claim 12, wherein determining the compensation value for the sensor data based on the contact force being outside of the contact force range comprises determining the compensation value for the sensor data based on a difference between the contact force and at least one of an upper bound or a lower bound of the contact force range.

14. The wearable device of claim 12, wherein the one or more processors is further configured to:
determine a current activity being performed by the user; and
determine, based on the current activity, at least one of an upper threshold or a lower threshold based of the contact force range.

15. The wearable device of claim 11, wherein the one or more processors is further configured to:
input the sensor data and data describing the back electromotive force ("EMF") of the actuator into a machine-learned model configured to receive the sensor data and the data describing the back electromotive force ("EMF") of the actuator, and in response to receipt of the sensor data and data describing the back electromotive force ("EMF") of the actuator, output compensated sensor data,
receive, as an output of the machine-learned model, compensated sensor data.

16. The wearable device of claim 11, wherein the one or more processors is further configured to:
determine that the contact force exceeds an upper threshold or is less than a lower threshold;
in response to determining that the contact force exceeds the upper threshold or is less than the lower threshold, provide a notification to the user of the wearable device.

17. The wearable device of claim 11, wherein the one or more processors is configured to:
determining, based on the data that describes the contact force, a quality metric describing a data quality of sensor data collected by a sensor of the wearable device; and
identify a portion of the sensor data as corrupt based on the quality metric.

18. The wearable device of claim 17, wherein the one or more processors is configured to, in response to identifying the portion of the sensor data as corrupt based on the quality metric, exclude the portion of the sensor data from further processing.

19. The wearable device of claim 11, wherein the sensor is arranged in a stacked configuration with the actuator.

20. A method for determining sensor data quality for a wearable device, the method comprising:
measuring a back electromotive force ("EMF") of an actuator of the wearable device;
accessing sensor data from one or more sensors of the wearable device;
inputting the sensor data and data describing the back EMF of the actuator into a machine-learned model configured to receive the sensor data and the data describing the back EMF of the actuator, and in response to receipt of the sensor data and the data describing the back EMF of the actuator, output compensated sensor data; and
receiving, as an output of the machine-learned model, compensated sensor data.

* * * * *